May 15, 1951 B. M. HADFIELD 2,552,781

ELECTRONIC COUNTING ARRANGEMENT

Filed Aug. 31, 1946 4 Sheets-Sheet 1

INVENTOR.
BERTRAM MORTON HADFIELD

BY Mc Walter Owen.

ATTORNEY

ELECTRONIC COUNTING ARRANGEMENT

Filed Aug. 31, 1946 4 Sheets-Sheet 2

*INVENTOR.*
BERTRAM MORTON HADFIELD
*BY* [signature]
ATTORNEY

May 15, 1951 B. M. HADFIELD 2,552,781

ELECTRONIC COUNTING ARRANGEMENT

Filed Aug. 31, 1946 4 Sheets-Sheet 3

INVENTOR.
BERTRAM MORTON HADFIELD

BY Wm. Walter Owen

ATTORNEY

ELECTRONIC COUNTING ARRANGEMENT

INVENTOR.
BERTRAM MORTON HADFIELD

BY Wm Watts Dewey

ATTORNEY

Patented May 15, 1951

2,552,781

UNITED STATES PATENT OFFICE 2,552,781

ELECTRONIC COUNTING ARRANGEMENT

Bertram Morton Hadfield, Harrow Weald, England, assignor to Automatic Electric Laboratories, Inc., Chicago, Ill., a corporation of Delaware Application August 31, 1946, Serial No. 694,403
In Great Britain September 5, 1945

7 Claims. (Cl. 235—92)

The present invention relates to electronic pulse counting arrangements and is more particularly concerned with counting arrangements employing a thermionic valve circuit having two stable regions of operation on either side of an unstable region and provided with two control means which exert controls in opposite senses to enable the circuit to operate as a scale-of-two counter.

One of the objects of the invention is to provide improved means for controlling the pulse counting arrangements which in a simple manner prevent a single input pulse from causing two counting steps. A further object of the invention is to provide arrangements whereby scale-of-two counters may be made to indicate the count in decade sequences thereby avoiding laborious addition of the individual indications which are in powers of two.

According to one feature of the invention, the input pulses are directed alternately to the two control means by the provision of a switching device which is controlled by the condition of the circuit prior to the reception of a given input pulse.

According to a further feature of the invention, the input pulses are directed alternately to the two control means by the provision of two back-to-back rectifiers which are arranged to perform a switching operation by the application thereto of an individual bias in accordance with the condition of the circuit prior to the reception of a given input pulse.

According to a further feature of the invention, the input pulses are directed alternately to the two control means by the provision of a switching device adapted to be operated by a change in the condition of the circuit due to an input pulse, a delay greater than the duration of an input pulse being introduced between a change in the condition of the circuit and the operation of the switching device.

According to a further feature of the invention, in an electronic pulse counting arrangement employing a plurality of serially arranged thermionic valve circuits each of which is adapted to operate as a scale-of-two counter, counting on a decade basis is effected by employing two groups of scale-of-two counters arranged in tandem, the second group being the tens counting group while the first group consists of four counters and the arrangement is such that in order to control the counters of the second group a signal is developed in the first group which is fed to the second group and also controls the counters of the first group consequent upon the change in the condition of the counters of the second group.

Most present forms of electronic counters of the scale-of-two type, consists of two thermionic valves coupled together so that the loop path gain exceeds unity (i. e. a condition suitable for instability), and in which the couplings have direct components ensuring that the steady state conditions of the circuit are non-oscillatory. Because of the two valves, there are two distinct control members, to which application of a given sense of input voltage, in turn, results in opposite senses of steady state. The device is fundamentally a trigger stage having two control members producing opposite effects. Owing to the markedly non-linear characteristics of the valves (e. g. the onset of grid current, anode cutoff, or the "knee" voltage on the anode characteristic), the steady state currents are limited, and, provided the loop path gain when the valves are working within their normal range is large enough, the control members are rendered alternately ineffective over a considerable range of input voltage. The latter property is generally used to direct an input common to both control members to the one so affected by the non-linear characteristics of the circuit.

However, upon the attempted operation of the counter by the input in this way, the linear regime of the circuit must be passed through completely, and during this time both control members could be affected, with the result that the desired operation of the circuit is retarded if not stopped. Moreover, either a positive or negative input will commence the changeover of the circuit. Consequently additional directive means have to be called into play at the stage where the desired form of input has caused partial changeover of the circuit. Furthermore, and essential to any form of such circuit, the directive properties of the circuit have to have time delays imposed on their action in directing the input to the control members, so that misdirection due to the first changeover of the circuit cannot occur during the effective pulse length of the input. Since these time delays would therefore have to vary with the form of the input pulse, it is general to make the latter of exponential form whatever the nature of the original input, so that the simple exponential time delays possible in the circuit can be consistently effective.

It will be seen therefore, that the usual directive properties of the circuit must cease to function properly at some time during operation unless reinforced by additional means occurring at or before such cessation. This leads to great difficulty in the basic design, apart altogether from the detailed design to ensure non-misdirection.

In the present invention it is therefore proposed that the input shall be directed to the control members alternately by an additional circuit not depending on the non-linear characteristics of the valves, and controlled by the previous state of the circuit. Then provided a time delay is imposed on the changeover of the control on this additional circuit, so that the input has time to become ineffective, there can be no possibility of both control members being affected simultaneously by the input. Furthermore if the means of direction in the additional circuit be non-linear, then it can be easily arranged that only inputs of one sense can be effective. Hence the design of the counter becomes a matter of the additive designs of the directing circuit and the trigger stage, instead of overall design or trial and error methods.

The invention will be better understood from the following description of a number of embodiments taken in conjunction with the accompanying drawings in which.

For the sake of simplicity, because it has only one valve per trigger stage, the invention will be described with reference to my copending application Serial No. 687,637, filed August 1, 1946, although it will be obvious to those skilled in the art that it can be applied to any direct coupled trigger stage possessing two control members of opposing senses.

Figure 1:
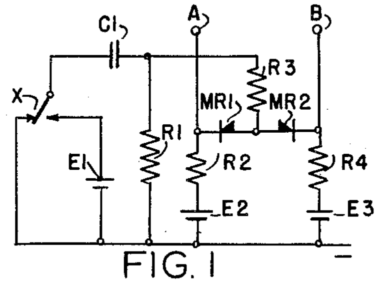
Figs. 1 and 2 show the principles of the invention.

Referring first to Fig. 1 of the drawings this shows the first form of the circuit according to the invention. Operation of the contact or switch X from the position shown in the drawing to the alternative position causes an exponential voltage pulse to be developed across R1 due to the presence of the condenser C1, the initial amplitude of the pulse being E where E is the voltage of the battery E1. This voltage pulse is applied through R3 to the junction of the negative poles of the rectifiers MR1 and MR2 and a truncated form of the pulse appears across R2 or R4 according to the bias applied to the rectifiers by the batteries E2 and E3. Thus if E2 has a value $e1$ and E3 has a value $e21$ which exceeds $e1$ plus the voltage drop across R2 due to E1, then the input is directed entirely to terminal A with respect to the negative busbar. If on the other hand E3 has a value $e22$ which together with the voltage drop across R4 due to E1 is less than $e1$, then the input is entirely directed to terminal B. Hence if $e21$ and $e22$ be derived from the change of circuit current of the trigger stage due to a previous operation the direction of the next to the appropriate control member is ensured by the proper connections from terminals A and B to the respective control members.

Figure 2:
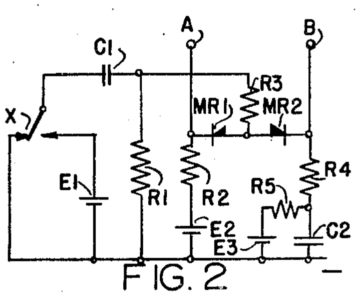

In order to ensure that the input pulse has time to decay to inoperative values, before the direction of itself by the change of $e21$ to $e22$ or vice versa, a smoothing circuit R5, C2 may be added to the circuit as shown in Fig. 2. This is merely an obvious time delay change to the circuit of Fig. 1.

Reverting to Fig. 1 it will be understood that it is desirable that for a given maximum input E, the maximum value of the truncated exponential outputs on R2 and R4 shall be equal assuming that the two control members require the same input to be effective.

Taking the case where $e21$ is greater than $e1$ and $Va$ is the voltage of A with respect to the negative busbar, and is less than $e21$, $$Va = e1 + \frac{R2}{R2+R3}(E-e1)$$

and since $Va_{max.}$ must not exceed $e21$ for the maximum input $Em$, we have, $$Va_{max.} = e21 = e1 + \frac{R2}{R2+R3}(Em-e1) \quad (1)$$

The maximum positive increment on R2 is obviously $e21-e1$, and we have, $$e21-e1 = \frac{R2}{R2+R3}(Em-e1) \quad (2)$$

Taking the case where $e22$ is less than $e1$, and $Vb$, the voltage at point B is less than $e1$, and by analogy we have the maximum positive increment on R4 is $$e1-e22 = \frac{R4}{R4+R3}(Em-e22) \quad (3)$$

Assuming the $Em$'s to be the same, and the maximum positive increments to be the same, then $$e1 = \frac{e22+e21}{2} \quad (4)$$

Thus knowing the maximum positive increment required on the control members and either $e21$ or $e22$, enables $e1$ to be found. Postulating $Em$ as high as possible, in order that lower values may not give a substantial difference between the two outputs, gives R2/R3 and R4/R3. Postulating R3 on the grounds of load current from E1 gives R2 and R4, or postulating R2 or R4 on the grounds of rectifier characteristics, gives R3 and R4 or R2.

Figure 3:
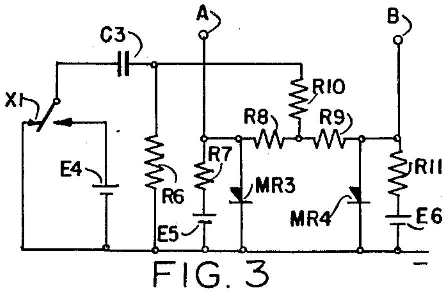
Figs. 3 and 4 show the use of delay circuits.
Figure 4:
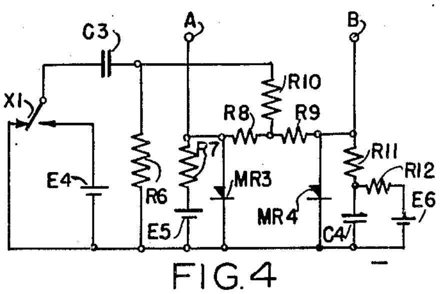

Fig. 3 shows an alternative form of circuit in which the rectifiers MR3 and MR4 shunt the output elements R7, E5 and R11, E6. The exponential input across R6 has now to be negative in sign, and forces MR3 or MR4 to become non-conducting according as to whether $e21$ exceeds $e1$ or $e22$ is less than $e1$ respectively where $e1$ is now the value of E5 and $e21$ and $e22$ are the alternative values of E6. Resistances R8 and R9 maintain the impedance of the circuit before the rectifiers become non-conducting and enable the production of equal output pulses of negative sign from A and B for a given maximum input voltage. The circuit has one or two advantages over Fig. 1. The initial voltages of A and B are zero and do not therefore have to be taken into account in the design of the trigger stage, and the impedance of the circuit is a minimum when no output pulse is being produced, which enables the time constant to be lower for non-operative inputs thus speeding up the ineffective time lag of the whole circuit. For instance when an output pulse ceases, it does so because the appropriate rectifier starts conducting, thereby lowering the impedance and time constant and hence the time taken for the input to attain steady state. Again the necessary time delay for the change of $e21$ to $e22$ and vice versa, may be provided by a smoothing circuit such as R12, C4, as shown in Fig. 4, which is otherwise identical with Fig. 3.

Figure 5:
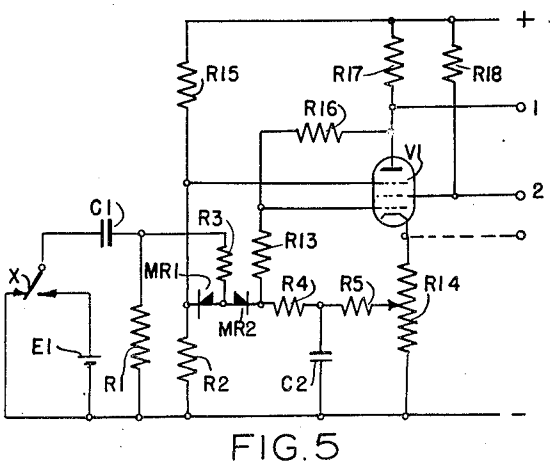
Figs. 5, 6, 7 and 8 show alternative arrangements.
Figure 6:
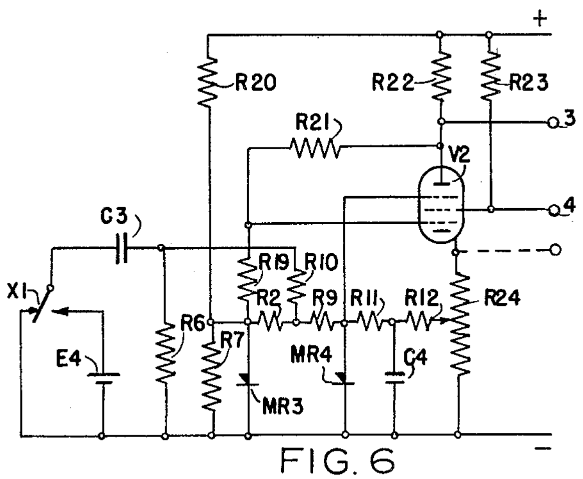

In both these circuits it will be noticed that alternate direction of the input to the control members has been secured simply, that the necessary time delay on the change of direction is simple, and that the circuits are immune from operation by pulses of opposite sense. Hence they may be directly applied to any direct coupled trigger stage having two opposing control members. Figs. 5 and 6 show such application to the trigger stage disclosed in my copending application previously referred to.

Fig. 5 shows the circuit of Fig. 2 applied to the above trigger stage to form a scale-of-two counter, using the same lettering similar components being indicated by the same references. The voltage $e1$ is incorporated within R2 by means of a current drawn from the supply busbars through R15 and point A is connected to the suppressor grid of valve V1. The voltage $e21$ or $e22$ is obtained from a tap on the cathode resistance R14, since in operation this trigger stage has two different cathode currents. Resistances R13 and R16 complete the potentiometer feedback from the anode resistance R17 to the control grid, whilst one type of output may be obtained from the anode via terminal 1 and another from the screen via terminal 2.

Assuming that with the contact X in the position shown, no anode current flows, the screen current will equal the cathode current I1 and this will be the larger value of cathode current and the bias on MR2 will be $e21$. When the contact X is changed over, a positive-going exponential pulse is applied to the circuit via R1 and appears across R2 so that the suppressor voltage goes positive and anode current flows. The feedback from R17 via R16 causes this flow to be cumulative and the circuit triggers with the consequence that the cathode current decreases to I2, the anode and screen currents then being $k.I2$ and $(1-k)I2$ respectively, where $k$ is the normal ratio of anode to cathode current. The voltage available for biasing the rectifier MR2 thus decreases to $e22$ and is applied after a delay determined by the smoothing circuit R5, C2, this delay time exceeding the duration of the input pulse. The circuit remains in this condition until the next operation of X i. e.until a positive-going exponential pulse is again applied to the circuit via R1. This pulse appears across R4 and is applied to the control grid the voltage of which increases followed by that of the cathode, thereby causing the suppressor voltage to go negative with respect to the cathode and thus reduce the anode current flow. This flow is also comulative due to the feedback from R17 and the anode current is cut off and the valve current passes to the screen, the cathode current now being increased to its initial value I1. The circuit is now restored to its original condition. If the succeeding counter is of the same type, it may be driven from the voltage change on the anode since this is positive-going on restoration of the initial state i. e. on every second input pulse. If, however, the next counter is of the type requiring a negative input for its operation, then the voltage change on the screen may be used.

Fig. 6 shows the circuit of Fig. 4 applied to the same form of trigger circuit, to give a scale-of-two counter operated by negative input pulses. Again assuming that no anode current flows initially, then a negative exponential input pulse drives MR3 non-conducting, applies negative voltage to the control grid, reduces the cathode current, reduces the bias on the suppressor grid which causes anode current to flow, and the feedback from R22 to the control grid makes the action cumulative. The next negative input pulse restores the initial condition, because MR4 is now made non-conducting owing to the reduction in cathode bias thereon, and if the next counter is of the same type, it may be driven from the voltage change on the screen grid via terminal 4, while if it is of the type requiring a positive voltage change it may be driven from the voltage change on the anode via terminal 3.

Figure 7:
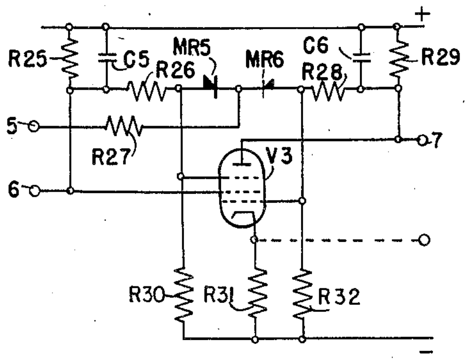

It is obvious that the circuit principles of Figs. 1 to 4 may be used if both $e1$ and $e2$ vary according to the previous state of the counter circuit currents, with the proviso that both $e1$ and $e2$ must now be provided with time delays. Fig. 7 shows a typical way in which this may be done.

The voltages on the anode and screen resistances R29, R25, are now used to bias the directive rectifiers MR6 and MR5 respectively whilst the feedback potentiometers to control and suppressor grids are comprised by R28, R32, and R26, R30 respectively. Assuming no anode current as before, MR5 is additionally biased by the screen current flowing down R25, whilst MR6 is unbiased by anode current through R29, although biased by the steady drop on R28 (as is also MR5 by the steady drop on R26). A negative input pulse with respect to the busbars at terminal 5 can therefore circulate more easily through MR6 and provides a corresponding negative bias on the control grid. This reduces the cathode current, and the suppressor bias, which causes anode current to flow and the feedback from R29 makes this action cumulative. The condenser C5 prevents the additional bias on MR5 from disappearing too fast so that the input pulse cannot be misdirected to the suppressor grid. The next pulse restores the initial state, and if the next counter is also a negative input type, it can be driven from terminal 6 which if it is of the positive input type it can be driven from terminal 7. An alternative driving source for positive input counters can be obtained from the voltage change on the cathode resistance in all three Figs. 5 to 7 as shown by the dotted connection.

Figure 8:
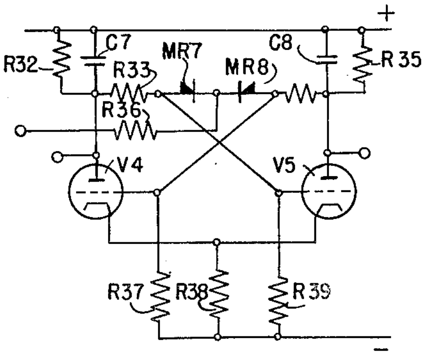

If in Fig. 7 the valve V3 be replaced by two valves having a common cathode resistance the anodes connected to R29 and R25 respectively, and the negative rectifiers cross-connected respectively to the control grids, as shown in Fig. 8, then the trigger circuit is similar to that conventionally used, although the means of direction are in accordance with this invention. Similarly the direction circuit may be biased from the voltage drops on R37 and R39 in a similar manner to Fig. 2 but incorporating smoothing on E2, using two valves and a conventional trigger circuit. The use of a common cathode resistance, is not, however, usual, and results in dispensing with the usual need for a three busbar supply.

It is a further object of the invention to show how such scale-of-two counters may be arranged so that the count is recorded in decades, to facilitate computation. The typical counter of Fig. 5 will be used by way of example.

Figure 9:
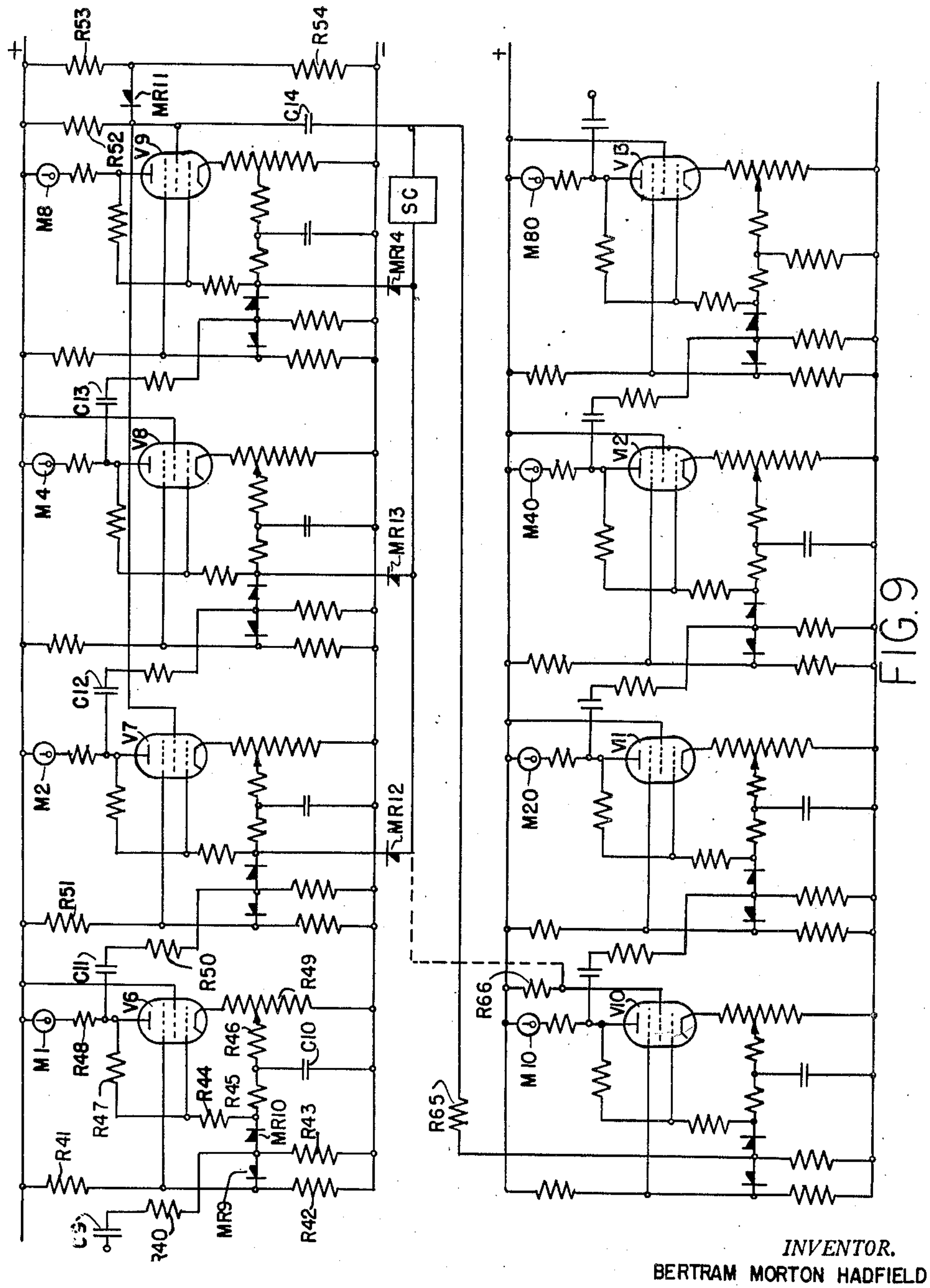
Fig. 9 shows a decade counter for forward counting.

Fig. 9 shows four scale-of-twos connected in tandem, each according to Fig. 5 supplied from the upper two busbars, and coupled by means of condensers C11, C12 and C13. In each of the anode circuits, a meter or similar device may be connected, as shown at M1, M2, M4, M8 and so on, the numbers corresponding to the number of input pulses counted by each stage. Thus M1 counts every pulse, M2 counts every second pulse, M4 counts every fourth pulse, and M8 counts every eighth pulse. Hence with this simple arrangement it would be possible to register up to 15 pulses, or multiples of 15 plus a number less than 15, except that the order of multiple would be unknown. If further counters were added, then a count of $2^n-1$ could be registered, where $n$ equals the number of counters. It is clear, however, that for large numbers, some laborious addition would be required after the electronic count, although of course this is the most economical use of such counters for a given number of pulses.

In order to count in decade sequences, at least four scale-of-two counters must be used in tandem, and the problem is to ensure that on receipt of the 10th pulse (*a*) the counter is set back to zero, and (*b*) a pulse is transmitted to the first counter of the next tandem four scale-of-twos.

Since, prior to the receipt of the 10th pulse counters 1 and 8 are on, it has previously been proposed that the receipt of the 10th pulse in causing 1 to go off, shall also cause 8 to go off by coupling the output of 1 to 8, and that since 1 going off would normally put 2 on, then 8 going off shall prevent 2 coming on by coupling the output of 8 back to 2. There are two disadvantages to this method. The first is that on receipt of the 8th pulse, counter 8 has a positive excitation due to 4, and a negative due to 1, which means a difference of design as between the output of 4 and the other counters, in order to ensure that the next input to 8 on the 8th pulse is positive. The second is that counter 2 must have a much greater operate lag than the other counters, since its tendency to operate normally when 1 goes off on receipt of the 10th pulse, must be delayed until 8 has been released by 1 and has also transmitted back the pulse to stop 2 from operating. While 2 can, of course, be designed to have a greater operate lag than the others, this feature limits the maximum counting speed by the time interval necessary between the 10th and 11th pulses. This time interval will be the normal minimum pulse time for counter 1 to release, plus the time for 8 to release, plus the time for 2 to release. This method of cancelling the 10th indication may therefore halve the maximum speed of counting.

In the present arrangement, the 10th pulse is received normally, so that 2 and 8 are operated. This operation, however, is utilised to produce a pulse which is fed back to counters 2, 4 and 8 to cause them to release again. Thus the 11th pulse can be received normally, because operation of 1 does not affect 2, and we have the whole time between the 11th and 12th pulses (at the highest counting speed) to effect cancellation of 2 and 8. Since the time taken for this is no more than for any one of the counters to release, the maximum counting speed is not affected. Moreover, the designs of all four counters can now be the same as regards operate and release times, and amplitude of normal operating voltages. All that is necessary is that the release time for the cancelling pulse derived from the previous operation of 2 and 8 shall not exceed the normal release time, and that the magnitude as applied to 4 shall prevent 4 from operating when 2 is cancelled, which is an easy matter because the cancel pulse on 4 arrives before the operate pulse from 2's cancellation.

This sequence is brought about in Fig. 9 in the following way. The screen electrodes of 2 and 8 are commoned via resistance R52 to the positive busbar, so that when either or both operates positive pulses would be available on R52. That due to operation of 2 or 8 alone, however, is not permitted to be effective, due to the provision of rectifier MR11 which is biased by R53, R54 so as to be conducting if one or both screen currents are at their high value. The resistance R53 is very much less than R52 so that in these conditions substantially all the current flow is through R53 and the positive voltage developed across R52 is negligible. When 2 and 8 are operated, however, the screen current is low and MR11 is non-conducting so that all the current flow is through R52. Therefore, the positive pulse on R52 is only available when 2 operates and 8 has been operated, i. e. on receipt of the 10th pulse only. It is then applied via condenser C14, and any suitable time delay given by a smoothing circuit such as is indicated by Sc and via rectifiers MR12, MR13 and MR14 to the control grids of 2, 4, and 8 simultaneously. The rectifiers prevent interaction between the pulses arriving at 2, 4 and 8 in the normal operation of the group, and by feeding the cancelling pulse into the control grid circuits behind their directive rectifiers, interference with, or from, the suppressor grids and their associated circuits is avoided.

The positive pulse from R52 can also be used to operate the first counter of the next group of four tandem scale-of-two counters, and if preferred, on the grounds of power output, the cancelling pulse can be taken from a screen resistance R56 back to the first group, as shown in dotted lines.

The sacrifice of 6 counts of a possible total of 15 by this method of using four scales-of-two and restricting the count per group to 9, does not involve a similar valve wastage. For instance, using scales-of-two in straightforward tandem connection permits a count of $2^n-1$, where $n$ is the number of scales-of-two, or, in the present case, the number of valves. Hence if X be the number to be counted, then $$n=\frac{\log (X+1)}{\log 2}=3.33 \log (X+1) \qquad (5)$$

Using them in groups of four in tandem, each group counting up to 9, permits a count of $10^{n/4}-1$, where $n$ is the number of scales-of-two, i. e. the number of valves. Hence, $$n=4 \log (X+1) \qquad (6)$$

and $n$ must in practice be the nearest high integer, i. e. the last group of four need not be fully equipped. Thus the decade form using scales-of-two counters, only incurs 20% more valves, strictly speaking, of course, in the limit when $n$ is large. Comparing this with the conventional method of obtaining a decade count, which is to use a scale-of-two followed by a scale-of-five having a total of 2 plus 5 or 1 plus 5 valves, we have, $$n=7 \log (X+1), \text{ or } 6 \log (X+1) \qquad (7)$$

Hence, using the single valve scale-of-two arranged for decade counting, shows a saving of from 75% to 50% in valves over the usual scale-of-10, and a wastage of 20% over the straightforward scale-of-two sequence. Considering that the final computation of a scale-of-two count is extremely laborious or alternatively the arrangements to convert electrically are complicated and marginal, and that the design and correct operation of the scale-of-five is very difficult, it is clear that the method shown of restricting the count per group to 9 is advantageous.

To avoid the provision and reading of separate meters or like devices such as neon lamps at each stage of the count, a single meter per group may be used energized with currents drawn from the individual stages over suitable resistances so that the correct weight is attached to the current from a given stage. In this manner, and using the decade arrangement, the meter readings for the various decades give the count directly.

In order to reset the whole counter to zero, the correct potential conditions must be applied to each stage for a sufficient time to ensure steady state conditions. This may be done by applying positive bias to all control grids, or reducing the positive bias of all suppressor grids. The latter may be easily arranged by connecting all the resistances such as R41 together at the ends which normally connect with the positive supply busbar, and providing a key switch for such disconnection.

The counter may be made to count backwards in one of two ways. The first way is to provide the screen leads with meters or like devices, or with a common meter per decade. When the anode count is 0 then the screen count is 15, and for every one added to the anode count, one is obviously subtracted from the screen. In this way, and subtracting 6 from the individual screen counts on each group, a subsequent forward count may be measured as a backward count.

Figure 10:
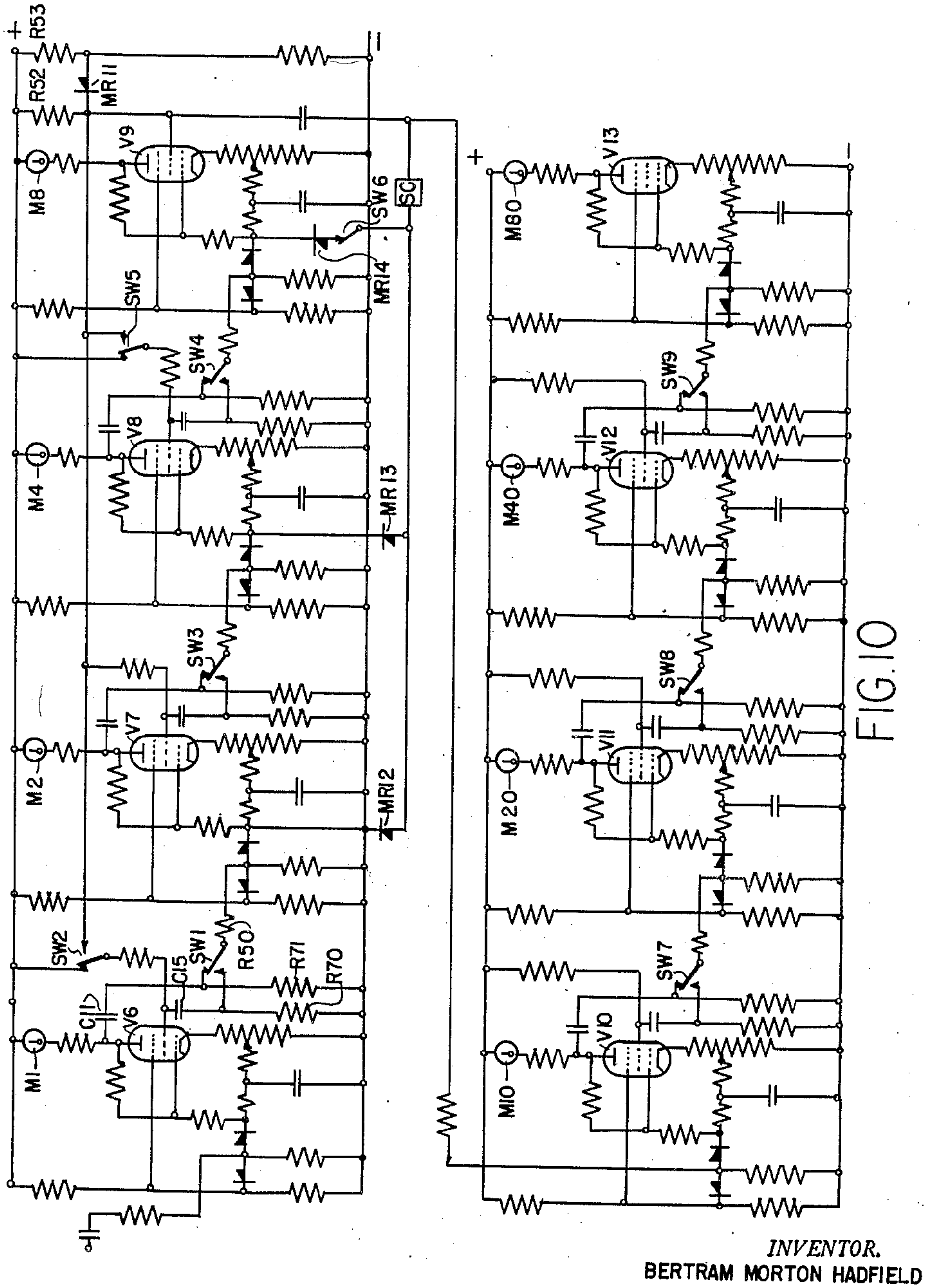
Fig. 10 shows a decade counter for backward counting.

The second method makes use of the same anode meters and gives direct readings which subtract one per input pulse from any established count. The circuit is shown in Fig. 10 in which components which also appear in Fig. 9 are given the same reference numeral. The circuit of Fig. 10 is arranged by means of the changeover switch SW to operate as a forward or backward counter, operation as a forward counter being obtained with the switch SW in the position shown in the drawing when the circuit is substantially the same as Fig. 9. The effect of operating the switch SW to the backward count position is that every stage other than the first receives a driving pulse when the previous stage is operated instead of when it is released, i. e. the significance of the device is reversed. This is effected by providing the anode and screen with output circuits connected to the contacts of the changeover switch, the pole of which is connected to the input circuit of the next stage. Thus for the valve V6 the anode output circuit consists of C11 and R71 and is connected to the next stage when the switch is in the forward count position while with the switch in the backward count position the screen circuit consisting of C15 and R70 is connected to the next stage. Thus at any stage subsequent to the proper receipt of a pulse which has been registered in an additive manner, the switch may be thrown without affecting the counter display, so that subsequent drives are taken from the screen outputs. Hence if 1 and 2 are on prior to changeover, then the next pulse drives 1 off but does not affect 2, thus leaving a count of 2, while the next pulse drives 1 on and 2 off leaving a count of 1 and the third pulse drives 1 off but does not affect 2, leaving 0. The fourth pulse would drive all the counters on and this occurs in fact on the next pulse after any given set up has been reduced to zero in any group. Now if prior to changeover the count is greater than 10, the pulse arriving after the count has been reduced to 10 should give a count of 9 i. e. 1 and 4 on instead of all on. A count of 9 is produced and a pulse is passed to the decade group to reduce the count by one by tying all the screen return leads together and connecting them to R52 and by disconnecting the rectifier MR14. The tying together of the screen return leads is effected by SW2 and SW5 and the disconnection of MR14 by SW6. A positive voltage is now obtained across R52 when all the counters are on i. e. all screen currents are at their minimum value, and this positive voltage is fed to the first counter of the decade group and via the smoothing circuit SC and rectifiers MR12 and MR13 to restore 2 and 4. The connection of the screen leads of 1 and 4 to R52 is a refinement since it is unlikely when counting backwards that 2 and 8 will ever be operated except for the digit 0.

In this manner the same counter may be made to measure an unknown number of pulses (e. g. a time interval), and to reproduce it thereafter. In addition if the counter is preset, the backward count will be this much greater, irrespective of the unknown input pulse number (provided it does not exceed the total capacity). If the unknown input plus the preset number does exceed the total capacity, the backward count will be less than the unknown by the difference between the capacity and the preset number.

I claim:

1. In an electronic pulse counting arrangement, a thermionic tube circuit including a single thermionic tube with two stable regions of operation on either side of an unstable region, said single thermionic tube in said circuit having a cathode, control grid and another electrode, a source of potential, a cathode circuit connecting said cathode to said source of potential, a first control circuit connecting said control grid to said cathode circuit, a second control circuit connecting said other electrode to said cathode circuit, a pair of rectifiers connected back-to-back, a circuit connecting said rectifiers to said first and second control circuits, an input circuit connected to said rectifiers to provide pulses to said tube to control the conduction of said tube, means in said second control circuit connected to said source of potential to provide a fixed bias to one of said rectifiers, and means including a resistor in said cathode circuit controlled by the conduction of said tube and connected to the other of said rectifiers to provide a variable bias to said other rectifier for changing the relative bias of said rectifiers rendering said rectifiers alternately conductive to ultimately control the conductivity of said tube by applying the input pulses from said input circuit alternately to said first and second control circuits to provide a single pulse output from said thermionic tube circuit for each two pulses received from said input circuit.

2. An electronic pulse counting arrangement as claimed in claim 1 in which said last means includes a time delay circuit for delaying the application of said variable bias for a period greater than the duration of the input pulse.

3. An electronic pulse counting arrangement including a plurality of successive pulse counters as claimed in claim 1 in which said thermionic tube also includes an anode electrode and circuit connected to said thermionic tube circuit to provide anode voltage in response to said tube conducting, and a circuit connecting said plurality of successive pulse counters in cascade so that each succeeding counter is controlled by the anode voltage of the preceding counter.

4. In an electronic pulse counting arrangement, a single pentode tube having a cathode, a control grid, a screen grid, a suppressor grid and an anode, a source of potential, a cathode circuit connecting said cathode to said source of potential, a control circuit connecting said control grid to said cathode circuit, a suppressor circuit connecting said suppressor grid to said cathode circuit, an anode circuit connecting said anode to said source of potential, a screen grid circuit connecting said screen grid to said source of potential, a pair of rectifiers connected back-to-back, a circuit connecting said pair of rectifiers to said suppressor circuit and said control circuit, means in said suppressor circuit connected to said source of potential for applying a fixed bias to one of said rectifiers, an input circuit connected to said rectifiers to control the conduction of said pentode tube, and means including a resistor in said cathode circuit controlled by the conduction of said pentode tube and connected to the other rectifier of said rectifiers to provide a variable bias to said other rectifier for changing the relative bias of said rectifiers rendering said rectifiers alternately conductive to ultimately control the conductivity of said tube by applying the input pulses from said input circuit alternately to said suppressor and control circuits thereby controlling the anode and screen potentials thereof so that they vary inversely thereby providing a single pulse output from said anode circuit for each two pulses received from said input circuit.

5. An electronic pulse counting arrangement as claimed in claim 4 in which said last means includes a time delay circuit for delaying the application of said variable bias for a period greater than the duration of the input pulse.

6. An electronic pulse counting arrangement including a plurality of successive counters such as claimed in claim 4 and a circuit for connecting said plurality of successive counters in cascade so that each succeeding counter is controlled by the anode voltage of the preceding counter.

7. A decade pulse counting arrangement including a plurality of pulse counters such as claimed in claim 4 and including a circuit for connecting said plurality of counters in cascade into a units group and a tens group so that each succeeding counter of a group is controlled by the anode voltage of the preceding counter of the same group, and means interconnecting the counters of the units group and the first counter of the tens group and responsive to the screen currents of the second and fourth counters of the units group to provide a positive pulse to the tens group of counters to indicate a total of ten.

BERTRAM MORTON HADFIELD.

REFERENCES CITED

The following references are of record in the file of this patent:

UNITED STATES PATENTS

| Number | Name | Date |
|---|---|---|
| 2,060,095 | Mathes | Nov. 10, 1936 |
| 2,275,016 | Koch | Mar. 3, 1942 |
| 2,289,988 | Norton | July 14, 1942 |
| 2,305,625 | Lauer | Dec. 22, 1942 |
| 2,329,792 | Skellett | Sept. 21, 1943 |
| 2,348,016 | Michel | May 2, 1944 |
| 2,384,379 | Ingram | Sept. 4, 1945 |
| 2,402,989 | Dickinson | July 2, 1946 |
| 2,405,095 | Mumma | July 30, 1946 |
| 2,410,156 | Flory | Oct. 29, 1946 |
| 2,422,698 | Miller | June 24, 1947 |
| 2,442,428 | Mumma | June 11, 1948 |
| 2,456,029 | Snyder, Jr. | Dec. 14, 1948 |
| 2,459,181 | Rosen et al. | Jan. 18, 1949 |

OTHER REFERENCES

Proceedings of the Cambridge Philosophical Society, vol. 33, 1937, "A 'Scale-of-Two' High-Speed Counted Using Hard Vacuum Triodes," by Lewis, pp. 549–558.

Review of Scientific Instruments, vol 8, Nov. 1937, "A Vacuum Tube Circuit for Scaling Down Counting Rates," by Stevenson, et al., pp. 414–416.

Review of Scientific Instruments, vol. 9, Mar. 1938, "A Triode Vacuum Tube Scale-of-Two Circuit," by Lifschutz et al., pp. 83–89.

Review of Scientific Instruments, vol. 9, July 1938, "New Vacuum Tube Counting Circuits," by Reich, pp. 222, 223.

Electronics, June 1944, "A Four Counter Decade," by Potter, pp. 110–113, 358, 360.